(12) United States Patent
Elmdahl et al.

(10) Patent No.: US 10,944,682 B2
(45) Date of Patent: Mar. 9, 2021

(54) METHOD, DEVICES AND A WIRELESS MESH NETWORK FOR ESTABLISHING A ROUTE BETWEEN A ROUTE ORIGINATOR, RO, MESH NODE AND A ROUTE DESTINATION, RD, MESH NODE IN A MESH NETWORK

(71) Applicant: Telefonaktiebolaget LM Ericsson (publ), Stockholm (SE)

(72) Inventors: Per Elmdahl, Linköping (SE); Piergiuseppe di Marco, Sollentuna (SE); Jingcheng Zhang, Svärtinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/335,338

(22) PCT Filed: Sep. 22, 2016

(86) PCT No.: PCT/EP2016/072563
§ 371 (c)(1),
(2) Date: Mar. 21, 2019

(87) PCT Pub. No.: WO2018/054468
PCT Pub. Date: Mar. 29, 2018

(65) Prior Publication Data
US 2019/0280984 A1    Sep. 12, 2019

(51) Int. Cl.
*H04L 12/801* (2013.01)
*H04W 40/28* (2009.01)
(Continued)

(52) U.S. Cl.
CPC ............. *H04L 47/34* (2013.01); *H04L 45/26* (2013.01); *H04W 4/80* (2018.02); *H04W 40/246* (2013.01);
(Continued)

(58) Field of Classification Search
CPC ........ H04W 4/80; H04W 40/248; H04L 45/26
See application file for complete search history.

(56) References Cited

U.S. PATENT DOCUMENTS

| 2008/0316997 | A1  | 12/2008 | Zeng et al. |              |
|--------------|-----|---------|-------------|--------------|
| 2008/0317047 | A1* | 12/2008 | Zeng ....... | H04W 40/28   |
|              |     |         |             | 370/401      |
| 2009/0316668 | A1* | 12/2009 | Bahr ....... | H04W 40/246  |
|              |     |         |             | 370/338      |

FOREIGN PATENT DOCUMENTS

| CA | 2817659 A1 | 5/2007 |
| WO | WO 2006/121683 A2 * | 5/2005 |
| WO | 2006121683 A2 | 11/2006 |

\* cited by examiner

*Primary Examiner* — Yemane Mesfin
*Assistant Examiner* — Henry Baron
(74) *Attorney, Agent, or Firm* — Murphy, Bilak & Homiller, PLLC

(57) ABSTRACT

Method of establishing a route between a Route Originator, RO, mesh node and a Route Destination, RD, mesh node in a mesh network, said mesh network comprising a plurality of mesh nodes, said method comprising the steps of assembling a Route Request, RREQ, message, broadcasting said assembled RREQ message in said mesh network, receiving, by said RD mesh node, via any of said plurality of mesh nodes, said RREQ message, and transmitting, by said RD mesh node, a Route Reply, RREP, message towards said RO mesh node, and receiving, by said RO mesh node, via any of said plurality of mesh nodes, said RREP message thereby establishing said route between said RO mesh node and said RD mesh node, wherein an Route Sequence Number is used, which is a number specific for a pair of RO mesh node and RD mesh node.

10 Claims, 5 Drawing Sheets

(51) Int. Cl.
*H04W 40/24* (2009.01)
*H04L 12/721* (2013.01)
*H04W 4/80* (2018.01)
*H04W 84/18* (2009.01)
(52) U.S. Cl.
CPC ......... *H04W 40/248* (2013.01); *H04W 40/28* (2013.01); *H04W 84/18* (2013.01)

METHOD, DEVICES AND A WIRELESS MESH NETWORK FOR ESTABLISHING A ROUTE BETWEEN A ROUTE ORIGINATOR, RO, MESH NODE AND A ROUTE DESTINATION, RD, MESH NODE IN A MESH NETWORK

TECHNICAL FIELD

The present invention is generally related to wireless mesh networks, more specifically to methods for establishing a route between two mesh nodes of the mesh network.

BACKGROUND

A wireless mesh network, WMN, comprises a plurality of mesh nodes organized in a mesh topology. Here, each mesh node is also some sort of provider by forwarding data to the next mesh node. The network infrastructure is decentralized and simplified because each mesh node only needs to be able to transmit to a neighbouring mesh node. Such wireless mesh networks could allow people living in remote areas and small businesses operating in rural neighbourhoods to connect their networks together for affordable internet connections.

Wireless mesh network can self form and self heal. These networks can be implemented with various wireless technologies including 802.11, 802.15, 802.16, cellular technologies and do not need to be restricted to a particular technology or protocol.

In Bluetooth, BT, mesh standardization, Mesh version 1.0 is currently in the later phases of being standardized. The algorithm for relaying packets, or messages, is most likely based on a flooding principle. In a flooding based network, all intermediate mesh nodes participate in forwarding the message. Once a message is sent from an originator device towards a destination device, each intermediate mesh node that receives the message repeats it until the number of times the message is being repeated is larger than the message life time, also known as Time to Live, TTL. A message that is being forwarded by an intermediate mesh node needs to be cached in order to make sure that each message is relayed only once.

In Bluetooth Mesh standardization, Mesh version 1.1 is in its early stage of being standardized. Here, the current proposal is to introduce a distributed routing algorithm. The task of the routing algorithm is to create a route through the intermediate mesh nodes between the message originator and the message destination, and then to send data messages along this route. The message format and the forwarding methods are the same as for flooding. However, intermediate mesh nodes that do not belong to the route will ignore these data messages and will not forward them.

In the design of the routing algorithm for Bluetooth Mesh, there is a difference compared to other, conventional, routing approaches. Classic routing algorithms assume that an intermediate mesh node needs to store one route per destination in its Routing Table, independently of the source that generated the message. By having each device indicating the next hop in the data messages, this ensures that the message travels only along a selected route. In Bluetooth mesh, there is however no explicit indication of the next hop in the data messages. Therefore, an intermediate mesh node needs to store information about both the source and the destination of a route, in its Routing Table information, to ensure that a message only travels along a selected route.

Currently, a route is created using the following rules. Here, a Route Originator, RO, mesh node intend to create a route to a Route Destination, RD, mesh node. The RO mesh node broadcasts a Route Request, RREQ, message, comprising the addresses of the RO mesh node and the RD mesh node. Each intermediate mesh node re-broadcasts this RREQ message, while keeping information about this RREQ in a Route Discovery Table, RDT. Once the message reaches the RD mesh node, the RD replies to the RREQ message with a Route Reply, RREP, message. The RREP message is not broadcasted, but is unicasted to the intermediate mesh node that directly delivered the RREQ message to the RD mesh node. Once an intermediate mesh node receives an RREP message, it forwards the message to the selected intermediate mesh node towards the RO mesh node. Again, the RREP message is forwarded using unicast. At the same time, each intermediate mesh node that receives the RREP message adds an entry to its Routing Table, containing information about the RO mesh node and the RD mesh node. As a results, the intermediate mesh node is considered as part of the route. When the RREP message arrives at the RO mesh node, the RO mesh node considers the route to be successfully created.

Each RO mesh node associates a sequence number to each RREQ message it originates. The sequence number is increased by one every time a new RREQ message is issued. The sequence number is then included in the RREQ message as an "Originator Sequence Number", OSN, field.

The sequence number is used for a number of purposes. An RO mesh node can send several RREQ messages in parallel, even to the same RD mesh node. In this case, the OSN, together with the address of the RO mesh node, are used to distinguish the different RREQ messages. The routing algorithms require that an intermediate mesh node updates its RDT entry for this particular route if an RREQ message arrives with the same RO mesh node and the same RD mesh node, but with an updated OSN. If this happens, the information of the previous RREQ message is overwritten in the RDT.

One drawback of the above is that the OSN has, in practice, a limited size. As an example, it is likely that the OSN has an 8-bit value, and can therefore take on 256 different values. When the OSN reaches 255, it will wrap back to 0 again.

In the routing algorithm of the participating nodes, OSN values need to be compared in order to determine if one value is "newer" or "older" than another value.

Typically, the sequence number is incremented for each new RREQ message that a node originates. Since in many applications an RO mesh node establishes routes with many other mesh nodes, the sequence number update frequency scales with the number of destinations. This will deplete the number space, i.e. the 256 different values, quickly, and the OSN will wrap frequently. The intermediate mesh nodes that receive the RREQ message will compare the received sequence number with previously received sequence numbers from the same RO mesh node will be affected.

This is especially the case in situations where the sequence numbers wraps from the maximum value to the initial value, i.e. from 255 to 0, or the other way around. In these situations, the intermediate mesh nodes will consider the received RREQ message as an "old" message while in fact it is an updated message.

SUMMARY

It is an objective to provide for a method for establishing a route between a Route Originator, RO, mesh node and a Route Destination, RD, mesh node in a mesh network.

It is another objective to provide for an RO mesh node as well as an RD mesh node for operation in a wireless mesh network and arranged for establishing a route between these two nodes.

It is yet another objective to provide for a wireless mesh network supporting the method for establishing a route between the RO mesh node and the RD mesh node.

In a first aspect, there is provided a method of establishing a route between a Route Originator, RO, mesh node and a Route Destination, RD, mesh node in a mesh network, said mesh network comprising a plurality of mesh nodes.

The method comprises the step of assembling, by said RO mesh node, a Route Request, RREQ, message, wherein said RREQ message is related to said route between said RO mesh node and said RD mesh node. Here, the step of assembling comprises introducing, in said RREQ message, an address of said RO mesh node and an address of said RD mesh node, retrieving a Route Sequence Number, RSN, said RSN being a unique number specific for said pair of said RO mesh node and said RD mesh node, and updating said retrieved RSN, and introducing said updated RSN into said RREQ message.

In a further step, the method comprises the step of broadcasting, by said RO mesh node, said assembled RREQ message in said mesh network. The RREQ message is then received by one or more intermediate mesh nodes. Each mesh node will then broadcast the received message again to make sure that the RREQ message will be delivered to the RD mesh node. Before re-broadcasting the received RREQ message, each intermediate mesh node may check whether the RSN in the RREQ message is newer than the one it has on file, i.e. for example the one present in a Route Discovery Table, RDT. Thus, the intermediate mesh node may check whether the RSN for that specific pair of RO mesh and RD mesh node in the RREQ message is newer compared to the RSN for that specific pair of nodes in the Route Discovery Table. If that's the case, the RREQ message may be broadcasted by the intermediate mesh node. Typical details for the RDT are explained further on in this disclosure.

In a next step, the method comprises receiving, by said RD mesh node, via any of said plurality of mesh nodes, said RREQ message.

In a subsequent step, the method comprises the step of determining, by said RD mesh node, that said RREQ message is to be taken into account.

Finally, the method comprises the steps of transmitting, by said RD mesh node, in reply to said received RREQ message and to said determination that said RREQ message is to be taken into account, a Route Reply, RREP, message towards said RO mesh node, via said mesh network, and receiving, by said RO mesh node, via any of said plurality of mesh nodes, said RREP message thereby establishing said route between said RO mesh node and said RD mesh node.

The RD mesh nodes typically transmits the RREP message towards the intermediate mesh node from which the RD mesh node had first received the RREQ message. That intermediate mesh node then transmits the received RREP message towards the mesh node from which it first received the RREQ message, and so on. Finally, the RO mesh node is reached and the route between the RO mesh node and the RD mesh node is established. As such, the RREP message follows the path of the "least cost" back to the RO mesh node.

The method is at least based on the insight that Route Sequence Numbers should be defined between two nodes, i.e. the RO mesh node and the RD mesh node. As such, according to the present invention, there is not just one sequence number generator applicable for all routes from a certain RO, but there are a plurality of sequence number generators, each applicable for a single route between a particular RO mesh node and a particular RD mesh node. So, a particular RSN is only applicable for a specific route from one RO mesh node to one RD mesh node only.

The advantage hereof is that the routing algorithm is made more resilient to errors in cases where a large number of RREQs are being sent over a time smaller than the expiry time of the Route Discovery Table entries. By making the RSN increment per pair of RO and RD nodes instead of per RO, the wrap problem is significantly reduced compared to the conventional Route Sequence Number, RSN. As such, the method increases the accuracy, and reliability, of the sequence number value comparison.

It is noted that the present disclosure is explained mostly with respect to the Bluetooth mesh standard. The method is, however, applicable to any type of mesh network in which a route between nodes is established based on the flooding principle.

It is further noted that the step of retrieving a RSN related to the RREQ message assumes that a route had already been established, at least once, between the RO mesh node and the RD mesh node. It is however also conceivable that no route had been established before. In such a case the RSN is set to an initial value, for example "1".

In an example, said step of determining, by said RD mesh node, that said RREQ message is to be taken into account comprises at least one of:

comparing said RSN in said RREQ message with an RSN in a Route Discovery Table, RDT, specific for said RO mesh node and said RD mesh node, said RDT being comprised by said RD mesh node, and determining that said RSN in said RREQ message is newer than said RSN in said RDT;

determining that said RDT does not have an entry having an RSN specific for said RO mesh node and said RD mesh node, thereby determining that said RREQ message is to be taken into account.

Typically, the RD mesh node, as well as all the intermediate mesh nodes in the network, comprise a Route Discovery Table, RDT. The RDT is used for temporarily storing an RSN. Once a predetermined period, for example a lifetime period, has expired, the temporarily stored RSN is removed from the RDT. So, an entry of an RSN specific for a pair of RO mesh node and RD mesh node exists in cases when two, or more, RREQ messages are sent, by the same RO mesh node to the same RD mesh node, within a short period of time. In such a case, the intermediate nodes, or the RD mesh node, may update the entry in the RDT with information from the newer RREQ message, thereby effectively abandoning the "older" entry and keeping the new entry.

The above entails that a mesh node does not keep track of RSN's between pairs of RO mesh nodes and RD mesh nodes, wherein said mesh node is not acting as the RO mesh node. As such, it is assumed that each mesh node trusts the other mesh nodes in the network.

In another example, said step of retrieving said RSN comprises:

retrieving said RSN from a Route Sequence Number Table, RSNT, said RSNT being comprises by said RO mesh node, and wherein said step of updating said retrieved RSN comprises:

storing said updated RSN into RSNT.

It is noted that, in the situation described above, the RO mesh nodes communicates with a Route Sequence Number Table and the intermediate mesh nodes as well as the RD mesh node communicates with a Route Discovery Table. Each intermediate node, or even the RD mesh node, may also operate as an RO mesh node. In such a case, these nodes communicate to the RSNT as well.

The RSNT is responsible for maintaining the correct RSN for a specific pair of RO mesh node and RD mesh node. So, the RSNT may contain a plurality of entries, wherein each entry is directed to the same RO mesh node, i.e. the mesh node comprising the RSNT, and wherein each entry is directed to a different mesh node in the wireless mesh network.

In an example, the step of updating said retrieved RSN comprises of incrementing said retrieved RSN, or of decrementing said retrieved RSN.

It was found that it does not matter whether the updating of the RSN occurs via an incremental step or via a decrementing step. The specific incrementing details, for example incrementing by a value of "1" or by a value of "2" or the like is not required for the present disclosure to be enabled.

In accordance with the present invention, each mesh node may maintain its own Route Sequence Number Table, RSNT. The RSNT is used by ROs to keep track of the last RSN send from itself to a RD. Each entry of the RSNT comprises its own address, an address of one of the mesh node in the wireless mesh network acting as an RD mesh node, and an RSN related to that specific pair of mesh nodes. According to the present invention, a mesh node acting as an RO mesh node does not have to maintain a single number valid for all pairs of nodes in which it acts as an RO mesh node, within the network, but needs to maintain RSN's for a plurality of pairs of mesh nodes within the network, wherein it acts as an RO mesh node.

In a second aspect, there is provided a method of enabling a route to be established between a Route Originator, RO, mesh node and a Route Destination, RD, mesh node in a mesh network, said mesh network comprising a plurality of mesh nodes.

The method comprises the step of assembling, by said RO mesh node, a Route Request, RREQ, message, wherein said RREQ message is related to said route between said RO mesh node and said RD mesh node, wherein said step of assembling comprises introducing, in said RREQ message, an address of said RO mesh node and an address of said RD mesh node, and retrieving a Route Sequence Number, RSN, said RSN being a unique number specific for said pair of said RO mesh node and said RD mesh node, and updating said retrieved RSN, and introducing said updated RSN into said RREQ message.

Further, the method comprises the step of broadcasting, by said RO mesh node, said assembled RREQ message in said mesh network.

The above described aspect of the present disclosure is directed to the RO mesh node. It is noted that the RO mesh node may be any mesh node present in the network, as each mesh node may operate as an originator of a message, an intermediate node receiving and forwarding the message, and an intended destination node for a message.

The above described retrieving step may entail that the mesh node looks up a specific entry in a Route Sequence Number Table, RSNT, wherein said entry corresponds to the RO mesh node and the RD mesh node. The RSN of that looked up entry is then updated, i.e. incremented or decremented, and is introduced in the RREQ message. The updated RSN may then also be stored again in the RSNT for subsequent references.

In an example hereof, said method further comprises the step of:
receiving, originating from said RD mesh node, by said RO mesh node, via any of said plurality of mesh nodes, an RREP message thereby establishing said route between said RO mesh node and said RD mesh node.

In a further example, said step of updating said retrieved RSN comprises one of:
incrementing said retrieved RSN;
decrementing said retrieved RSN.

In an example, the network is a Bluetooth Mesh type network.

In a third aspect, there is provided a method of enabling a route to be established between a Route Originator, RO, mesh node and a Route Destination, RD, mesh node in a mesh network, said mesh network comprising a plurality of mesh nodes, said method comprising the steps of:
receiving, by said RD mesh node, via any of said plurality of mesh nodes, said RREQ message, wherein said RREQ message is related to said route between said RO mesh node and said RD mesh node;
determining, by said RD mesh node, that said RREQ message is to be taken into account, by at least one of:
comparing said RSN in said RREQ message with an RSN in a Route Discovery Table, RDT, specific for said RO mesh node and said RD mesh node, said RDT being comprised by said RD mesh node, and determining that said RSN in said RREQ message is newer than said RSN in said RDT;
determining that said RDT does not have an entry having an RSN specific for said RO mesh node and said RD mesh node, thereby determining that said RREQ message is to be taken into account;
retrieving a current RSN for said route between said RO mesh node and said RD mesh node;
retrieving, from said received RREQ message, said RSN;
determining that said RSN in said RREQ message is newer than said current RSN;
wherein said RSN being a unique number specific for said pair of said RO mesh node and said RD mesh node;
transmitting, by said RD mesh node, in reply to said received RREQ message and to said determination that said RREQ message is to be taken into account, a Route Reply, RREP, message towards said RO mesh node, via said mesh network.

The above described example is directed to the RD mesh node, being the intended recipient for the RO mesh node.

The expressions, i.e. the wording, of the different aspects comprised by the method and devices according to the present disclosure should not be taken literally. The wording of the aspects is merely chosen to accurately express the rationale behind the actual functioning of the aspects.

In accordance with the present disclosure, different aspects applicable to the above mentioned examples of the methods, including the advantages thereof, correspond to the aspects which are applicable to the devices or the wireless mesh network.

In a fourth aspect, there is provided a wireless mesh network comprising a Route Originator, RO, mesh node a Route Destination, RD, mesh node, and a plurality of mesh nodes, said wireless mesh network arranged to support of establishing a route between said RO mesh node and said RD mesh node,
wherein said RO mesh node comprises:
assemble equipment arranged for assembling a Route Request, RREQ, message, wherein said RREQ message is related to said route between said RO mesh node and said RD mesh node, wherein said assembling comprises:
    introducing, in said RREQ message, an address of said RO mesh node and an address of said RD mesh node,
    retrieving a Route Sequence Number, RSN, said RSN being a unique number specific for said pair of said RO mesh node and said RD mesh node,
    updating said retrieved RSN, and introducing said updated RSN into said RREQ message;
broadcast equipment arranged for broadcasting said assembled RREQ message in said mesh network,
wherein said RD mesh node comprises:
receive equipment arranged for receiving via any of said plurality of mesh nodes, said RREQ message, wherein said RREQ message is related to said route between said RO mesh node and said RD mesh node;
process equipment arranged for determining that said RREQ message is to be taken into account, by
    retrieving a current RSN for said route between said RO mesh node and said RD mesh node;
    retrieving, from said received RREQ message, said RSN;
    determining that said RSN in said RREQ message is newer than said current RSN;
transmit equipment arranged for transmitting in reply to said received RREQ message and to said determination that said RREQ message is to be taken into account, a Route Reply, RREP, message towards said RO mesh node, via said mesh network.
wherein said RO mesh node further comprises
receive equipment arranged for receiving, originating from said RD mesh node, via any of said plurality of mesh nodes, a RREP message thereby establishing said route between said RO mesh node and said RD mesh node.

In a fifth aspect, there is provided a Route Originator, RO, mesh node for operation in a wireless mesh network, said RO mesh node comprising:
    assemble equipment arranged for assembling a Route Request, RREQ, message, wherein said RREQ message is related to said route between said RO mesh node and said RD mesh node, wherein said assembling comprises:
        introducing, in said RREQ message, an address of said RO mesh node and an address of said RD mesh node,
        retrieving a Route Sequence Number, RSN, said RSN being a unique number specific for said pair of said RO mesh node and said RD mesh node,
        updating said retrieved RSN, and introducing said updated RSN into said RREQ message;
    broadcast equipment arranged for broadcasting said assembled RREQ message in said mesh network;
    receive equipment arranged for receiving, originating from said RD mesh node, via any of said plurality of mesh nodes, a RREP message thereby establishing said route between said RO mesh node and said RD mesh node.

In an example here, the RD mesh node comprises:
    receive equipment arranged for receiving via any of said plurality of mesh nodes, said RREQ message, wherein said RREQ message is related to said route between said RO mesh node and said RD mesh node;
    process equipment arranged for determining that said RREQ message is to be taken into account, by
        retrieving a current RSN for said route between said RO mesh node and said RD mesh node;
        retrieving, from said received RREQ message, said RSN;
        determining that said RSN in said RREQ message is newer than said current RSN;
    transmit equipment arranged for transmitting in reply to said received RREQ message and to said determination that said RREQ message is to be taken into account, a Route Reply, RREP, message towards said RO mesh node, via said mesh network.

In a sixth aspect, there is provided a non-transitory computer-readable storage medium, comprising instructions which, when executed on at least one processor, cause the at least one processor to carry out the method according to any of the method examples as disclosed above.

In a seventh aspect, there is provided a Route Originator, RO, mesh node for operation in a wireless mesh network, said RO mesh node comprising:
    assemble module for assembling a Route Request, RREQ, message, wherein said RREQ message is related to said route between said RO mesh node and said RD mesh node, wherein said assembling comprises:
        introducing, in said RREQ message, an address of said RO mesh node and an address of said RD mesh node,
        retrieving a Route Sequence Number, RSN, said RSN being a unique number specific for said pair of said RO mesh node and said RD mesh node,
        updating said retrieved RSN, and introducing said updated RSN into said RREQ message;
    broadcast module for broadcasting said assembled RREQ message in said mesh network;
    receive module for receiving, originating from said RD mesh node, via any of said plurality of mesh nodes, a RREP message thereby establishing said route between said RO mesh node and said RD mesh node.

In an eight aspect, there is provided a Route Destination, RD, mesh node arranged for operation in a wireless mesh network, said RD mesh node comprising:
    receive module for receiving via any of said plurality of mesh nodes, said RREQ message, wherein said RREQ message is related to said route between said RO mesh node and said RD mesh node;
    process module for determining that said RREQ message is to be taken into account, by
        retrieving a current RSN for said route between said RO mesh node and said RD mesh node;
        retrieving, from said received RREQ message, said RSN;
        determining that said RSN in said RREQ message is newer than said current RSN;
    transmit module for transmitting in reply to said received RREQ message and to said determination that said RREQ message is to be taken into account, a Route Reply, RREP, message towards said RO mesh node, via said mesh network.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
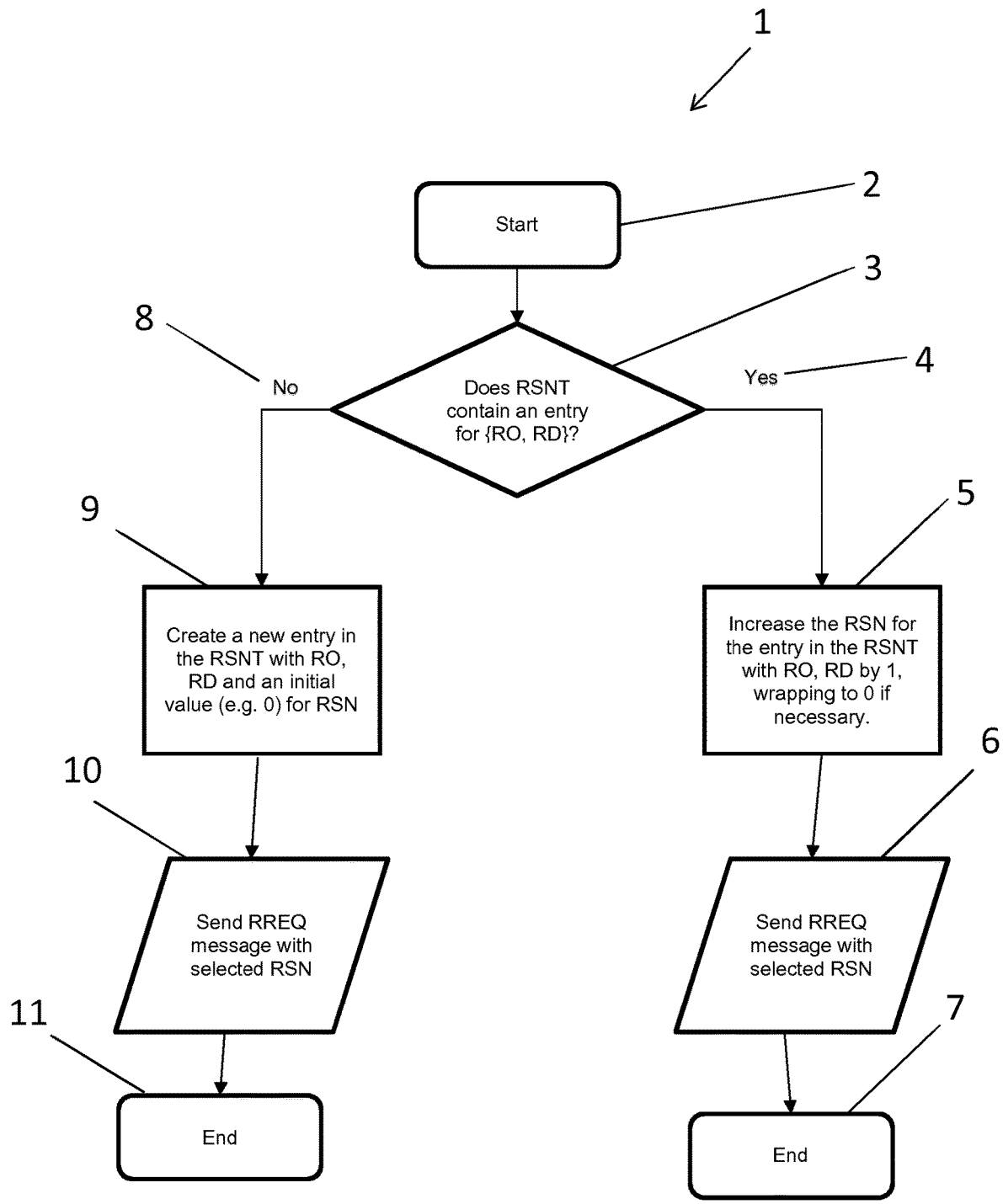
FIG. 1 is a schematic flow chart illustrating a basic aspect of the present disclosure.

FIG. 1 is a schematic flow chart 1 illustrating a basic aspect of the present disclosure. The flow chart 1 is initiated with a start terminal 2. The start is characterized by the decision of a Route Originator, RO, mesh node that it wants to establish, or refresh, a route between itself and a Route Destination, RD, mesh node in a mesh network.

The mesh network comprises a plurality of mesh nodes, each capable of receiving messages, and forwarding received messages to a further mesh node. In such a way, the range of a particular mesh node is extended, as the messages may be forwarded via the intermediate mesh nodes to the final destination node. The mesh network may consist of only two mesh nodes, the RO and the RD, or just a couple of mesh nodes, for example 5-10 mesh nodes, but may also comprise thousands of mesh nodes all together. The present disclosure is not limited to any size of the mesh network.

The RO mesh node is to make a decision 3 once the flow chart 1 has started. That is, the RO mesh node will determine whether its Route Sequence Number Table, RSNT, already contains an entry specifically for the particular pair of RO mesh node and RD mesh node. The RO mesh node thus checks whether an RSN already exists for the combination of the RO mesh node with the RD mesh node.

The RSNT may be a table comprised in a memory of the RO mesh node. The table is regularly updated with new pairs of mesh nodes, and their corresponding RSN's as well as with updated RSN's for pairs of mesh nodes that are already present in the table. It is noted that, typically, the RSNT is arranged in such a way that it only comprises pair of mesh nodes in which the node comprising the RSNT is acting as the RO mesh node. The RSNT does not need to maintain, or track, RSNs for pair of mesh nodes in which it does not act as an RO mesh node.

In case an RSN for that specific RO mesh node—RD mesh node combination is available 4, then the RSN in the table is increased by 1, and is wrapped to 0 if that's necessary. This is indicated with reference numeral 5 in FIG. 1.

A Route Request, RREQ, message is established having the updated RSN, and the RREQ message is then send 6, by the RO mesh node, into the mesh network. More specifically, the RREQ message is broadcasted to any of the mesh nodes of the mesh network. Finally, the flow chart 1 comes to an end 7.

It is also possible that no entry can be detected in the RSNT for the specific pair of the RO mesh node and the RD mesh node. This is indicated with reference numeral 8 in FIG. 1. In that particular case, a new entry in the RSNT is made, which new entry comprises the identities of the RO mesh node, i.e. itself, and the RD mesh and comprises an initial value for the RSN. The initial value is, for example, "0". This is indicated with reference numeral 9 in FIG. 1.

Again, a Route Request, RREQ, message is established having the newly created RSN, and the RREQ message is then broadcasted 10, by the RO mesh node, into the mesh network. Finally, the flow chart 1 comes to an end 11.

Figure 2:
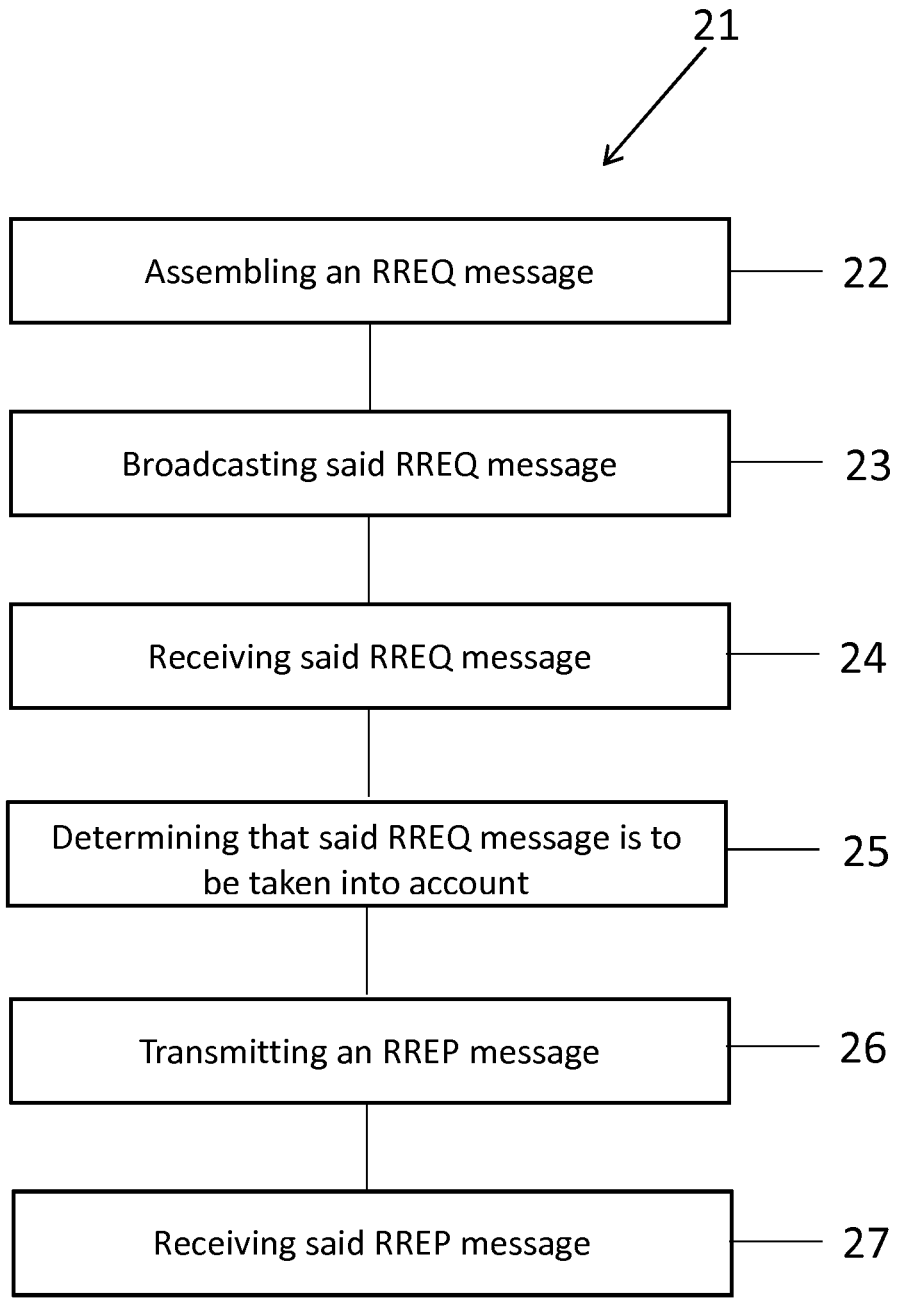
FIG. 2 is a flow chart illustrating a method according to the present disclosure.

FIG. 2 is a flow chart 21 illustrating a method according to the present disclosure.

The method 21 starts with a decision of the RO mesh node that it wants to establish, or refresh, a route between itself and a so called RD mesh node. The RD mesh node may be any mesh node in the same mesh network.

In order to establish a route between these two mesh nodes, a Route Request, RREQ, message is to be assembled 22 by the RO mesh node. The RREQ message may contain several bits of information, like the source address, the destination address, the lifespan, i.e. "lifetime", of the message and a Route Sequence Number which serves as a unique identification The assembling step 22 comprises several sub steps which are explained hereafter.

First, an address of the RO mesh node and an address of the RD mesh node is introduced in the RREQ message. The address may be an Internet Protocol, IP, address, a Bluetooth Mesh address or any other type address that is able to uniquely point to the intended mesh node.

Next, the RO mesh node retrieves the Route Sequence Number, RSN, wherein the RSN being a unique number specific for the pair of the RO mesh node and the RD mesh node. The RSN is, for example, retrieved from a Route Sequence Number Table, RSNT, maintained by the RO mesh node itself.

Finally, the RSN is updated, for example incremented or decremented, and the updated RSN is introduced in the RREQ message. The updated RSN may also be stored again in the RSNT for future reference.

In a next step, the RREQ message is broadcasted 23, by the RO mesh node, into the mesh network. The RREQ message is received by any intermediate mesh node in the mesh network, and the intermediate mesh nodes are arranged to broadcast the RREQ message to further mesh nodes until the message has received its intended mesh node.

It is noted that different methods or propositions exist for the intermediate nodes to forward the RREQ message. Typically, an intermediate mesh node has two choices. One, if they already know a particular route to the RD mesh node then they can send a Route Reply, RREP, message back to the RO mesh node. As such, that particular node is acting as the RD mesh node itself. Two, In case the intermediate mesh node is not aware of a route to the RD mesh node, it may rebroadcast the received RREQ message until its lifetime is up.

In case of the first choice, the following is noted. If a particular route to the RD mesh node is already known, the intermediate mesh node can send a Route Reply, RREP, message back to the RO mesh node. However, before doing so, the intermediate mesh node may first determine whether the known route is still likely to be valid. That is, if the intermediate mesh node had detected that one or more mesh nodes in that particular route are no longer available, or if the intermediate mesh node had detected that the known route is relatively "old', i.e. exceeding a predetermined validity time, than it could override its decision and reply with the RREP message. In such a case, it may decide that the known route is likely not to be valid anymore and go for choice 2. That is, is may rebroadcast the received RREQ message until its lifetime is up.

Typically, if the RO mesh node does not receive a reply in a predetermined set amount of time, it will rebroadcast the request except this time the RREQ message will have a longer lifespan and an updated RSN. All of the intermediate mesh nodes use the RSN in the RREQ message to ensure that they do not rebroadcast a RREQ message that is outdated by a later RREQ with a newer RSN.

In any case, the RREQ message will be received 24, by the RD mesh node, via any of the plurality of mesh nodes in the mesh network. The RD mesh node needs to determine that the RREQ message is to be taken into account 25.

Multiple options exist for determining that the RREQ message is to be taken into account. The present disclosure focuses on the below described options.

comparing said RSN in said RREQ message with an RSN in a Route Discovery Table, RDT, specific for said RO mesh node and said RD mesh node, said RDT being comprised by said RD mesh node, and determining that said RSN in said RREQ message is newer than said RSN in said RDT;

determining that said RDT does not have an entry having an RSN specific for said RO mesh node and said RD mesh node, thereby determining that said RREQ message is to be taken into account.

Once it has been established that the RSN in the RREQ message is newer, the RD mesh node may decide to transmit a Route Reply, RREP, message towards the RO mesh node, via the mesh network. The RREP message is typically not broadcast, but unicast, as the route between the RO mesh node and the RD mesh node is then already known. As such, the RD mesh nodes sends the RREP message to an intermediate mesh node from which it had received the RREQ message. That particular intermediate mesh node then receives the RREP message, and sends that RREP message to an intermediate mesh node from which it had received the RREQ message, etc. This principle is known as following the path of the "least cost" back to the RO mesh node.

Finally the RREP message will be sent, by an intermediate mesh node, to the RO mesh node. The RO mesh node will thus receive 27, via any of the plurality of mesh nodes, the RREP message and, as such, the route between the RO mesh node and the RD mesh node is established.

In its simplest from, the mesh network consists of only two nodes, In this case, there are no intermediate nodes, and the communication takes place between the RO and the RD only.

Figure 3:
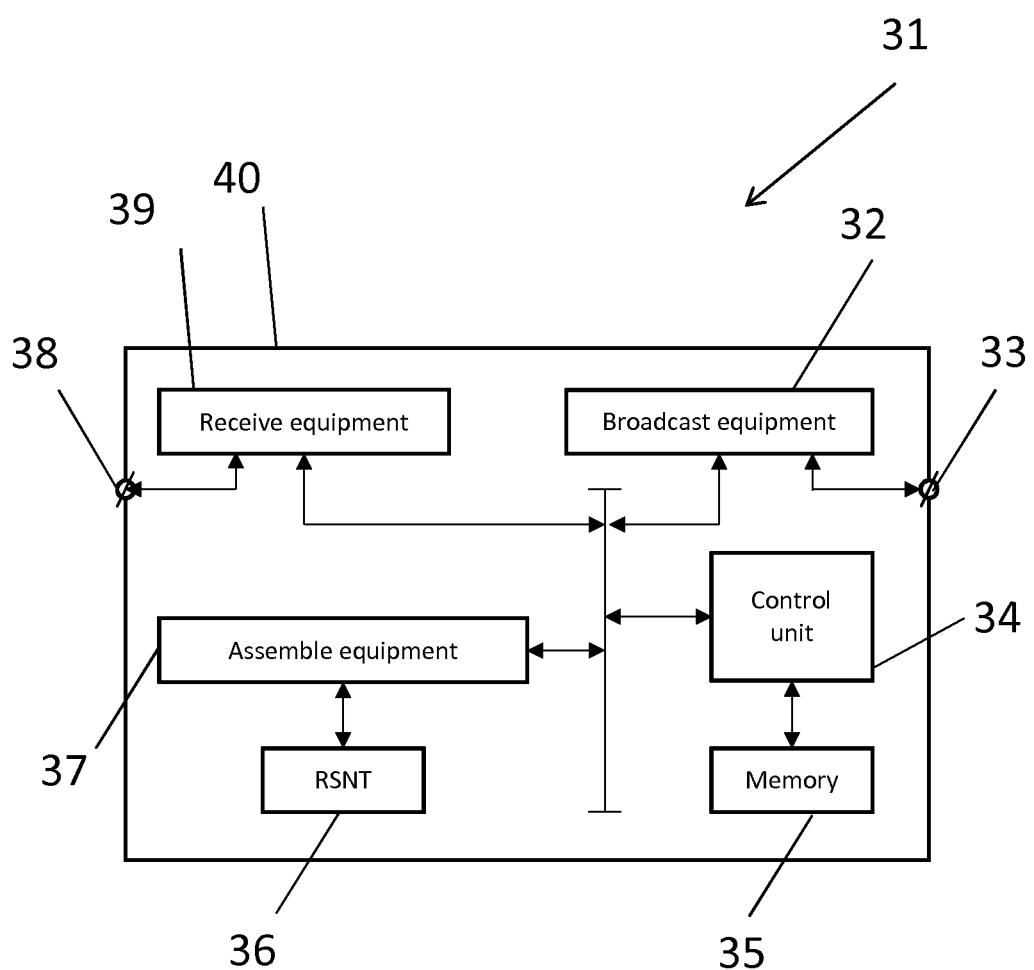
FIG. 3 is a schematic diagram illustrating an embodiment of a Route Originator mesh node.

FIG. 3 is a schematic diagram illustrating an embodiment of a Route Originator mesh node 31.

The RO mesh node 31 is arranged for operation in a wireless mesh network. The RO mesh node may be any mesh node in the network. It is specifically called an RO mesh node 31 as in the present case it operates as the intended originator of the RREQ message.

The RO mesh node 31 comprises a housing 40, in which said housing several components are integrated. For example, assemble equipment 37 is provided for assembling a Route Request, RREQ, message, wherein the RREQ message is related to the route between the RO mesh node and the RD mesh node. The assembling process entails that an address of the RO mesh node and an address of the RD mesh node is introduced in the RREQ message. Next, the assemble equipment 37 will retrieve a Route Sequence Number, RSN, wherein the RSN is a unique number specific for the pair of the RO mesh node and the RD mesh node.

In the present case, the RO mesh node 31 comprises an RSNT 36, which RSNT is used for maintaining a plurality of entries, each entry directed to a specific pair of RO mesh node and RD mesh node as well as an RSN related thereto. It is noted that each entry of the RSNT comprises the address of the node itself, being the node acting as the RO mesh node, and an address of a different RD mesh node in the wireless mesh network. As such, the assemble equipment looks in the RSN table to find an entry having the RO mesh node and the RD mesh node, and retrieves the RSN that corresponds thereto.

The retrieved RSN is updated, and introduced in the RREQ message that is being assembled, as well as fed back into the RSN table. The updating process may follow any predetermined flow. For example, the RSN may be incremented by "1", or may be decremented by "1". This will work especially well as long as all the mesh nodes in the wireless mesh network follow the same principle.

Broadcast equipment 32 is provided in the RO mesh node 32, which broadcast equipment 32 is arranged for broadcasting the assembled RREQ message in the wireless mesh network.

Receive equipment 39 is also provided in the RO mesh node 32, which receive equipment 39 is arranged for receiving, originating from said RD mesh node, via any of said plurality of mesh nodes, a RREP message thereby establishing said route between said RO mesh node and said RD mesh node.

Here, incoming data packets, or messages, pass through the input terminal 38 before the receive equipment 39, or receiving module. Outgoing data packets or messages pass or are sent by the broadcast equipment 32, or broadcast module, via the output terminal 33.

The RO mesh node 31 further comprises a control unit 34 and a memory 35, which control unit 34 is connected to the receive equipment 39, the broadcast equipment 32 and the assemble equipment 37 via a bus connection or the like.

Figure 4:
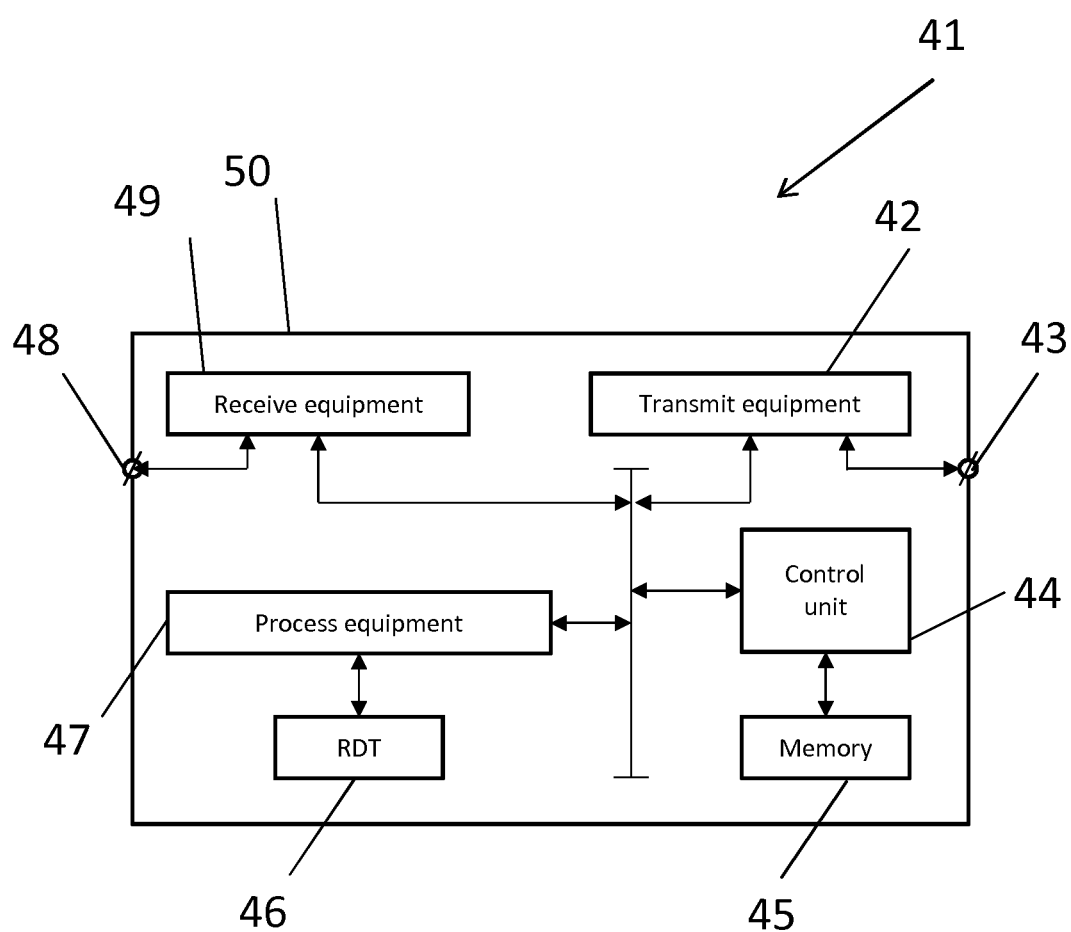
FIG. 4 is a schematic diagram illustrating an embodiment of a Route Destination mesh node.

FIG. 4 is a schematic diagram illustrating an embodiment of a Route Destination mesh node 41.

The RD mesh node 41 is arranged for operation in a wireless mesh network. The RD mesh node 41 may be any wireless mesh node in the wireless mesh network. It is specifically called an RD mesh node as it is the intended recipient of the RREQ message.

The RD mesh node 41 comprises a housing 50 in which a plurality of components are integrated. For example, receive equipment is provided for receiving via any of said plurality of mesh nodes, said RREQ message, wherein said RREQ message is related to said route between said RO mesh node and said RD mesh node.

The RD mesh node 41 may comprise a Route Discovery Table, RDT 46. The RDT is used for temporarily storing an RSN. Once a predetermined period, for example a lifetime period, has expired, the temporarily stored RSN is removed from the RDT. So, an entry of an RSN specific for a pair of RO mesh node and RD mesh node exists in cases when two, or more, RREQ messages are sent, by the same RO mesh node to the same RD mesh node 41, within a short period of time. In such a case, the intermediate nodes, or the RD mesh node, may update then entry in the RDT with information from the newer RREQ message, thereby effectively abandoning the "older" entry and keeping the new entry.

Further, process equipment 47 are provided arranged for determining that said RREQ message is to be taken into account, by retrieving a current RSN for said route between said RO mesh node and said RD mesh node, retrieving, from said received RREQ message, said RSN and determining that said RSN in said RREQ message is newer than said current RSN.

Further, transmit equipment are provided for transmitting in reply to said received RREQ message and to said determination that said RREQ message is to be taken into account, a Route Reply, RREP, message towards said RO mesh node, via said mesh network.

Here, incoming data packets, or messages, pass through the input terminal 48 before they receive the receive equipment 49, or receiving module. Outgoing data packets or messages pass or are sent by the transmit equipment 42, or transmit module, via the output terminal 43.

The RD mesh node 41 further comprises a control unit 44 and a memory 45, which control unit 44 is connected to the receive equipment 49, the broadcast equipment 42 and the process equipment 47 via a bus connection or the like.

Figure 5:
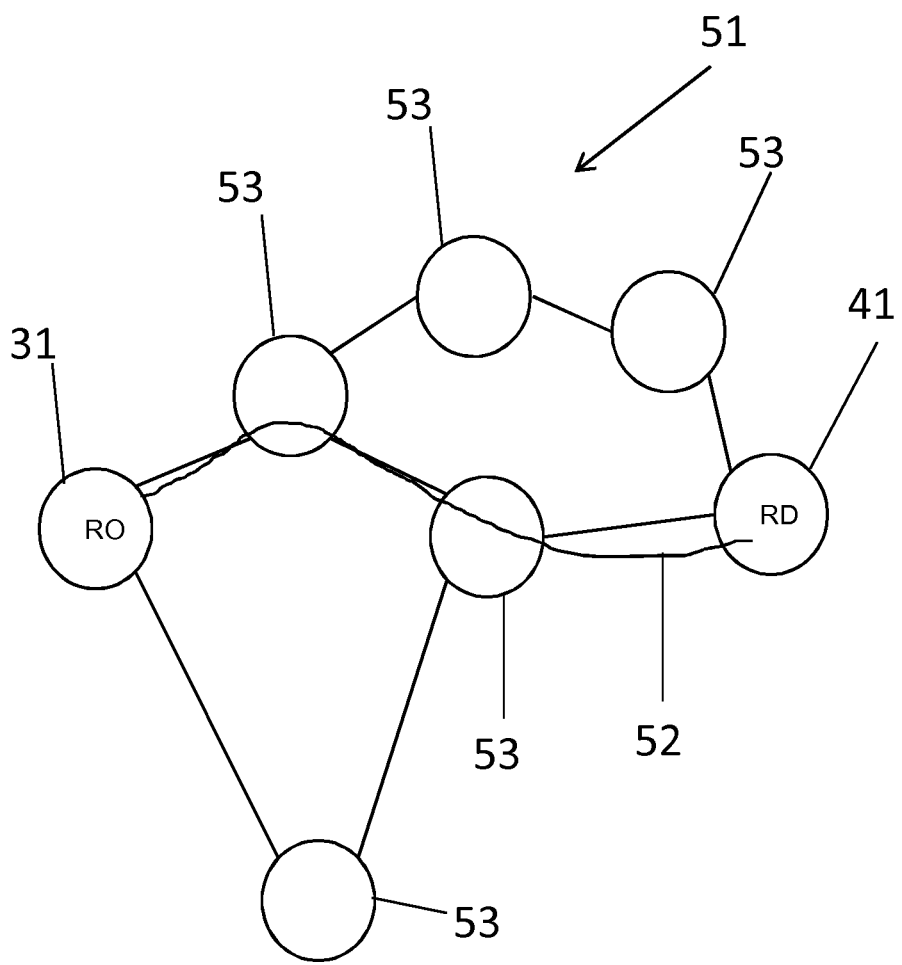
FIG. 5 is a schematic diagram illustrating an embodiment of a wireless mesh network.

FIG. 5 is a schematic diagram illustrating an embodiment of a wireless mesh network 51. The wireless mesh network 51 comprising a Route Originator, RO, mesh node 31 a Route Destination, RD, mesh node 41, and a plurality of mesh nodes 53, i.e. intermediate mesh node, said wireless mesh network arranged to support of establishing a route 52 between said RO mesh node 31 and said RD mesh node 41.

One of the advantages of the present disclosure is that the method is made more resilient to errors in cases where there is a large number of RREQs being sent over a time smaller than the expiry time of the entries in a Route Sequence Number Table, RSNT.

The method further improves the accuracy of sequence number value comparison, as in the presented method the "wrapping" case, i.e. the situation in which the number gets increased from its maximum value, for example value "255", to the initial value, for example value "0".

The present disclosure is not limited to the embodiments as disclosed above, and can be modified and enhances by those skilled in the art beyond the scope of the present disclosure as disclosed in the appended claims without having to apply inventive skills.

The invention claimed is:

1. A method of enabling a route to be established between a Route Originator (RO) mesh node and a Route Destination (RD) mesh node in a mesh network, said mesh network comprising a plurality of mesh nodes, said method comprising:
assembling, by said RO mesh node, a Route Request (RREQ) message, wherein said RREQ message is related to said route between said RO mesh node and said RD mesh node, wherein said step of assembling comprises:
introducing, in said RREQ message, an address of said RO mesh node and an address of said RD mesh node;
retrieving a Route Sequence Number (RSN) that is maintained by the RO mesh node with respect to the RD mesh node separate from RSNs maintained by the RO mesh node for RREQ messages targeting respective other RD mesh nodes; and
updating said retrieved RSN, and introducing said updated RSN into said RREQ message; and
broadcasting, by said RO mesh node, said assembled RREQ message in said mesh network.

2. The method according to claim 1, wherein said method further comprises:
receiving, by said RO mesh node via any of said plurality of mesh nodes, a Route Reply (RREP) message originating from said RD mesh node, thereby establishing said route between said RO mesh node and said RD mesh node.

3. The method according to claim 1, wherein said step of retrieving said RSN comprises:
retrieving said RSN from a Route Sequence Number Table (RSNT), said RSNT being in said RO mesh node, and wherein said step of updating said retrieved RSN comprises storing said updated RSN into said RSNT.

4. The method according to claim 1, wherein said step of updating said retrieved RSN comprises one of:
incrementing said retrieved RSN; and
decrementing said retrieved RSN.

5. The method according to claim 1, wherein said network is a BLUETOOTH Mesh type network.

6. A method of enabling a route to be established between a Route Originator (RO) mesh node and a Route Destination (RD) mesh node in a mesh network, said mesh network comprising a plurality of mesh nodes, said method comprising:
receiving, by said RD mesh node, via any of said plurality of mesh nodes, a Route Request (RREQ) message, wherein said RREQ message is related to said route between said RO mesh node and said RD mesh node, and wherein said RREQ message comprises an address of said RO mesh node and an address of said RD mesh node and a Route Sequence Number (RSN), said RSN being maintained by the RO mesh node with respect to the RD mesh node separate from RSNs maintained by the RO mesh node for RREQ messages targeting respective other RD mesh nodes;
determining, by said RD mesh node, that said RREQ message is to be taken into account, by comparing said RSN in said RREQ message with an RSN in a Route Discovery Table (RDT) that is specific for said pair of said RO mesh node and said RD mesh node, said RDT being in said RD mesh node, and determining that said RSN in said RREQ message is newer than said RSN in said RDT, or by determining that said RDT does not have an entry having an RSN specific for said pair of said RO mesh node and said RD mesh node; and
transmitting, by said RD mesh node, in reply to said received RREQ message and said determination that said RREQ message is to be taken into account, a Route Reply (RREP) message towards said RO mesh node, via said mesh network.

7. A Route Originator (RO) mesh node configured for operation in a wireless mesh network, said mesh network comprising a plurality of mesh nodes and a Route Destination (RD) mesh node, said RO mesh node comprising:
assemble equipment configured for assembling a Route Request (RREQ) message, wherein said RREQ message is related to said route between said RO mesh node and said RD mesh node, wherein said assembling comprises:
introducing, in said RREQ message, an address of said RO mesh node and an address of said RD mesh node;
retrieving a Route Sequence Number (RSN) that is maintained by the RO mesh node with respect to the RD mesh node separate from RSNs maintained by the RO mesh node for RREQ messages targeting respective other RD mesh nodes, and
updating said retrieved RSN, and introducing said updated RSN into said RREQ message;
broadcast equipment configured for broadcasting said assembled RREQ message in said mesh network; and
receive equipment configured for receiving, via any of said plurality of mesh nodes, a Route Reply (RREP) message originating from said RD mesh node, thereby establishing said route between said RO mesh node and said RD mesh node.

8. A Route Destination (RD) mesh node configured for operation in a wireless mesh network, said mesh network comprising a plurality of mesh nodes and a Route Originator (RO) mesh node, said RD mesh node comprising:

receive equipment configured for receiving via any of said plurality of mesh nodes, a Route Request (RREQ) message, wherein said RREQ message is related to said route between said RO mesh node and said RD mesh node, and wherein said RREQ message comprises an address of said RO mesh node and an address of said RD mesh node and a Route Sequence Number (RSN), said RSN being maintained by the RO mesh node with respect to the RD mesh node separate from RSNs maintained by the RO mesh node for RREQ messages targeting respective other RD mesh nodes;

process equipment configured for determining that said RREQ message is to be taken into account, by comparing said RSN in said RREQ message with an RSN in a Route Discovery Table (RDT) that is specific for said pair of said RO mesh node and said RD mesh node, said RDT being in said RD mesh node, and determining that said RSN in said RREQ message is newer than said RSN in said RDT, or by determining that said RDT does not have an entry having an RSN specific for said pair of said RO mesh node and said RD mesh node; and transmit equipment configured for transmitting in reply to said received RREQ message and said determination that said RREQ message is to be taken into account, a Route Reply (RREP) message towards said RO mesh node, via said mesh network.

9. The method of claim 1, wherein to maintain the RSN with respect to the RD mesh node separate from the RSNs maintained by the RO mesh node for the RREQ messages targeting the respective other RD mesh nodes, the method includes the RO mesh node generating RSNs separately with respect to each RD mesh node targeted by the RO mesh node.

10. The RO mesh node of claim 6, wherein to maintain the RSN with respect to the RD mesh node separate from the RSNs maintained by the RO mesh node for the RREQ messages targeting the respective other RD mesh nodes, the RO mesh node is configured to use a separate sequence number generator to generate RSNs with respect to each RD mesh node targeted by the RO mesh node.

* * * * *